(12) United States Patent
Visger et al.

(10) Patent No.: US 8,168,574 B2
(45) Date of Patent: May 1, 2012

(54) DISPERSANT VISCOSITY MODIFIERS BASED ON MALEIC ANHYDRIDE-STYRENE COPOLYMERS

(75) Inventors: Daniel Visger, Mentor, OH (US); Daniel Vargo, Willoughby, OH (US); Barton Schober, Perry, OH (US); Suzanne Patterson, Seven Hills, OH (US); Patrick E Mosier, Bay Village, OH (US); Christopher Friend, Bobbersmill (GB); John Pudelski, Cleveland Heights, OH (US); Michael J Covitch, Cleveland Heights, OH (US); Calvin James, Madison, OH (US); David Price, Littleover (GB); Leonard E Orzech, San Antonio, TX (US)

(73) Assignee: The Lubrizol Corporation, Wickliffe, OH (US)

( * ) Notice: Subject to any disclaimer, the term of this patent is extended or adjusted under 35 U.S.C. 154(b) by 899 days.

(21) Appl. No.: 11/568,051

(22) PCT Filed: Apr. 18, 2005

(86) PCT No.: PCT/US2005/013159
§ 371 (c)(1),
(2), (4) Date: Jun. 22, 2009

(87) PCT Pub. No.: WO2005/103093
PCT Pub. Date: Nov. 3, 2005

(65) Prior Publication Data
US 2009/0305923 A1 Dec. 10, 2009

Related U.S. Application Data

(60) Provisional application No. 60/563,537, filed on Apr. 19, 2004.

(51) Int. Cl.
C08F 8/00 (2006.01)
C08F 8/32 (2006.01)
C08F 20/34 (2006.01)
C08C 19/22 (2006.01)
C10M 133/00 (2006.01)

(52) U.S. Cl. ............ 508/500; 508/296; 525/326.1; 525/379; 525/375; 525/376; 526/310; 526/311; 526/259; 526/272

(58) Field of Classification Search ........... 525/326.1, 525/379, 375, 376; 526/310, 311, 259, 272; 508/296, 500
See application file for complete search history.

(56) References Cited

U.S. PATENT DOCUMENTS

| | | | |
|---|---|---|---|
| 3,041,315 A | 6/1962 | Gerlach et al. | |
| 3,702,300 A | 11/1972 | Coleman | |
| 4,596,863 A | 6/1986 | Sackmann et al. | |
| 4,604,221 A | 8/1986 | Bryant et al. | |
| 4,863,623 A | 9/1989 | Nalesnik | |
| 5,264,140 A | 11/1993 | Mishra et al. | |
| 5,409,623 A | 4/1995 | Mishra et al. | |
| 5,429,757 A | 7/1995 | Mishra et al. | |
| 5,563,118 A | 10/1996 | Mishra et al. | |
| 5,620,486 A | 4/1997 | Cherpeck | |
| 6,025,308 A | 2/2000 | Matsuya et al. | |
| 6,107,257 A | 8/2000 | Valcho et al. | |
| 6,107,258 A | 8/2000 | Esche, Jr. et al. | |
| 6,117,825 A | 9/2000 | Liu et al. | |
| 6,187,721 B1 | 2/2001 | Goldblatt et al. | |
| 6,207,624 B1 | 3/2001 | Stachew et al. | |
| 6,284,716 B1 | 9/2001 | Gunther et al. | |
| 6,544,935 B1 * | 4/2003 | Vargo et al. ............... | 508/232 |
| 2004/0043909 A1 | 3/2004 | Goldblatt et al. | |
| 2005/0153849 A1 * | 7/2005 | Mishra et al. ............ | 508/221 |
| 2006/0025316 A1 | 2/2006 | Covitch et al. | |

FOREIGN PATENT DOCUMENTS

| | | |
|---|---|---|
| CS | 200 359 B | 9/1980 |
| GB | 2033907 | 5/1980 |
| WO | 0198387 | 12/2001 |
| WO | WO 03099890 A2 * | 12/2003 |
| WO | 2005087821 | 9/2005 |

* cited by examiner

*Primary Examiner* — James Goloboy
*Assistant Examiner* — Pamela H Weiss
(74) *Attorney, Agent, or Firm* — David M. Shold; Christopher D. Hilker

(57) ABSTRACT

An interpolymer composition comprising monomer-derived units of (i) at least one of an aliphatic olefin containing from 2 to 30 carbon atoms and a vinyl aromatic monomer, and (ii) at least one alpha, beta-unsaturated acylating agent; wherein a portion of said acylating agent monomers is esterified and wherein a portion of said acylating agent monomers is condensed with at least one aromatic amine, provides good viscosity modification and dispersancy performance.

19 Claims, No Drawings

DISPERSANT VISCOSITY MODIFIERS BASED ON MALEIC ANHYDRIDE-STYRENE COPOLYMERS

BACKGROUND OF THE INVENTION

The present invention relates to dispersants for use in fuels and in engine oil lubricants, especially for reducing soot-induced viscosity increase in heavy duty diesel engines.

Heavy duty diesel vehicles may use exhaust gas recirculation (EGR) engines in efforts to reduce environmental emissions. Among the consequences of recirculating the exhaust gas through the engine are different soot structures and increased viscosity of the oil at lower soot levels, compared with engines without EGR. It is desirable that oil exhibit minimal viscosity increase, e.g., less than 12 $mm^2$/sec (cSt) at a soot loading of 6%.

It is also desirable that a lubricating oil composition maintain a relatively stable viscosity over a wide range of temperatures. Viscosity improvers are often used to reduce the extent of the decrease in viscosity as the temperature is raised or to reduce the extent of the increase in viscosity as the temperature is lowered, or both. Thus, a viscosity improver ameliorates the change of viscosity of an oil containing it with changes in temperature. The fluidity characteristics of the oil are improved.

Traditional dispersant viscosity modifiers (DVMs) made from ethylene-propylene copolymers that have been radically grafted with maleic anhydride and reacted with various amines have shown desirable performance to prevent oil thickening in diesel engines. Aromatic amines are said to show good performance in this regard. DVMs of this type are disclosed in, for instance, U.S. Pat. No. 6,107,257, Valcho et al., and U.S. Pat. No. 6,107,258, Esche et al., each Aug. 22, 2000, and U.S. Pat. No. 6,117,825, Liu et al., Sep. 12, 2000.

Other polymer backbones have also been used for preparing dispersants. For example, polymers derived from isobutylene and isoprene ("IOB/IP") have been used in preparing dispersants and are reported in WO 01/98387. Also, nitrogen-containing esterified carboxyl-containing interpolymers prepared from maleic anhydride and styrene-containing polymers are known from U.S. Pat. No. 6,544,935, Vargo et al. The present invention provides a dispersant viscosity modifier based on a polymer of a vinyl aromatic monomer such as styrene and an ester copolymer such as esterified maleic anhydride monomer, distinguished from earlier dispersants by means of, among other things, the molecular weight and identity of the polymer backbone and, generally, the selection of the amine component, leading to a significantly different polymeric structure. The present materials exhibit superior performance in engine tests.

The present invention, therefore, solves the problem of providing a low cost dispersant viscosity modifier having improved performance in engine tests, providing a good viscosity index and good soot dispersion and toleration properties, particularly in diesel engine, and especially in heavy duty diesel engines employing exhaust gas recirculation. The materials of the present invention can further impart antioxidant performance properties to lubricants.

SUMMARY OF THE INVENTION

Therefore, the present invention provides an esterified, nitrogen-functionalized interpolymer composition derived from monomers comprising (i) at least one monomer selected from (a) vinyl aromatic monomers and (b) aliphatic olefins containing from 2 to 30 carbon atoms, and (ii) at least one alpha, beta-unsaturated acylating agent; wherein a portion of said acylating agent-derived units is esterified and wherein a portion of said acylating agent-derived units is condensed with at least one aromatic amine containing at least one N—H group capable of condensing with said acylating agent monomer-derived unit.

The invention also provides lubricant and lubricant concentrates comprising the foregoing reaction product and an oil of lubricating viscosity, as well as a method for lubricating an internal combustion engine by supplying the same thereto.

The invention also provides a process for preparing a dispersant viscosity modifier, comprising reacting, in any order: (a) a carboxy-containing interpolymer comprising monomer-derived units of (i) at least one monomer selected from (a) vinyl aromatic monomers and (b) aliphatic olefins containing from 2 to 30 carbon atoms, and (ii) at least one alpha, beta-unsaturated acylating agent; (b) at least one alcohol having 8 to 20 carbon atoms; and (c) at least one aromatic amine containing at least one N—H group capable of condensing with said acylating agent.

The invention also provides a process for improving the viscosity index of a lubricating oil composition, comprising incorporating into said composition a minor, viscosity-improving amount, of the composition as described herein.

The invention also provides a process for lubricating an internal combustion engine, especially a diesel engine such as a heavy duty diesel engine, comprising supplying thereto the composition as described herein.

DETAILED DESCRIPTION OF THE INVENTION

Various features and embodiments will be described below by way of non-limiting illustration.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, or no more than one, non-hydrocarbon substituent will be present for every ten carbon atoms in the hydrocarbyl group; typically, there will be no non-hydrocarbon substituents in the hydrocarbyl group.

The Carboxy-Containing Interpolymer

The invention relates to an interpolymer composition comprising monomer-derived units (i) and (ii), wherein (i) is at least one of an aliphatic olefin containing from 2 to 30 carbon atoms and a vinyl aromatic monomer, and (ii) is at least one alpha, beta-unsaturated acylating agent.

As used herein, the term carboxy-containing interpolymer refers to polymers which are prepared using a carboxy-containing monomer. The carboxy-containing monomer is polymerized with other monomers to form the carboxy-containing interpolymer. Since the carboxy-containing monomer is incorporated into the polymer backbone, the carboxy groups extend from the polymer backbone, e.g., the carboxy groups are directly attached to the polymer backbone. Suitable carboxy-containing copolymers, to which the aromatic amines of the present invention may be affixed, are described in detail in U.S. Pat. No. 6,544,935, and reference should be made to that document for further details of the synthesis and composition of such polymers.

The carboxy-containing interpolymers useful in preparing the esters useful in the invention, that is, the "backbone" polymers, are copolymers, terpolymers, and other interpolymers of at least two monomers. One of the monomers (i) is at least one of an aliphatic olefin containing from 2 to 30 carbon atoms and a vinyl aromatic monomer. The other of said monomers (ii) is at least one alpha, beta-unsaturated acylating agent, typically a carboxylic acid or derivative thereof. Derivatives of the carboxylic acid are those which are polymerizable with (i) the olefin or the vinyl aromatic monomers, and as such may be the esters, especially lower alkyl esters, e.g., those containing from 2 to 7 carbon atoms in the ester alkyl group, especially 2 carbon atoms, halides, or anhydrides of the acids. The molar ratio of (i) to (ii) can be 1:2 to 3:1, and in one embodiment is 1:1. The carboxy-containing interpolymer is typically prepared by polymerizing the olefin or vinyl aromatic monomer with the alpha, beta-unsaturated carboxylic acid or derivative thereof. Mixtures of two or more compatible (i.e., nonreactive to one another) interpolymers which are separately prepared can also be used, if each of the polymers, or the mixture of the polymers overall, has the molecular weight or RSV as specified below.

Aliphatic Olefins

Suitable aliphatic olefin monomers that are useful in the preparation of the interpolymers of the invention include mono-olefins of 2 to 30 carbon atoms. Included in this group are internal olefins (i.e., wherein the olefinic unsaturation is not in the "1" or alpha position) and mono-1-olefins or alpha-olefins, which can be advantageously used. Exemplary olefins include ethylene, propylene, 1-butene, isobutene, 1-pentene, 2-methyl-1-butene, 3-methyl-1-butene, 1-hexene, 1-heptene, 1-octene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tetracosene, 1-pentacosene, 1-hexacosene, 1-octacosene, and 1-nonacosene. Commercially available alpha-olefin mixtures can also be used. Exemplary alpha-olefin mixtures include C15-18 alpha-olefins, C12-16 alpha-olefins, C14-16 alpha-olefins, C14-18 alpha-olefins, C16-18 alpha-olefins, C16-20 alpha-olefins, and C22-28 alpha-olefins. Additionally, C30+ alpha-olefin fractions such as those available from Conoco, Inc. can be used. Suitable olefin monomers include ethylene, propylene and 1-butene. Procedures for the preparation of mono-olefins are well known to those of ordinary skill in the art.

Vinyl Aromatic Monomers

Suitable vinyl aromatic monomers which can be polymerized with the alpha, beta-unsaturated acylating agents include styrene and the substituted styrenes. Other vinyl aromatic monomers such as the vinyl anthracenes and vinyl naphthalenes can also be used. Substituted styrenes include styrenes that have halo-, alkoxy-, carboxy-, hydroxy-, sulfonyl-, nitro-, nitroso-, and hydrocarbyl-substituents wherein the hydrocarbyl group typically has from 1 to 12 carbon atoms, as well as other substituents. Exemplary of the hydrocarbyl-substituted styrenes are alpha-methylstyrene, para-tert-butylstyrene, alpha-ethylstyrene, and para-lower alkoxy styrene. Mixtures of two or more vinyl aromatic monomers can be used. Styrene and alkylstyrenes are often selected.

Alpha, Beta-Unsaturated Acylating Agent

Suitable alpha, beta-unsaturated acylating agents useful in the preparation of the interpolymers are represented by carboxylic acids, anhydrides, halides, or lower alkyl esters thereof. Mixtures of such materials can also be used. These include mono-carboxylic acids (e.g., acrylic acid and methacrylic acid) and esters, e.g., lower alkyl esters thereof, as well as dicarboxylic acids, anhydrides and esters, e.g., lower alkyl esters thereof. In these materials a carbon-to-carbon double bond is typically in an alpha, beta-position relative to at least one of the carboxy functions (e.g., itaconic acid, anhydride or esters thereof, α-methylene glutaric acid or esters thereof) and may be in an alpha, beta-position to both of the carboxy functions of the alpha, beta-dicarboxylic acid, anhydride or the ester thereof (e.g., maleic acid or anhydride, fumaric acid, or ester, such as lower alkyl, i.e., those containing no more than 7 carbon atoms, esters thereof). Normally, the carboxy functions of these compounds will be separated by up to 4 carbon atoms, such as 2 carbon atoms.

A class of suitable α,β-unsaturated dicarboxylic acids, anhydrides, or esters includes those compounds corresponding to the formulae:

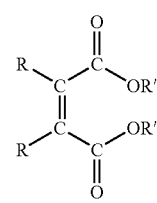

(I)

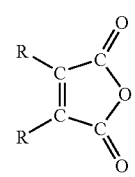

(II)

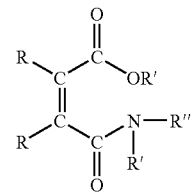

(III)

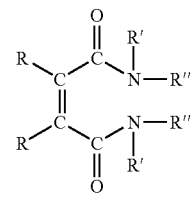

(IV)

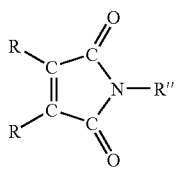

(V)

(including the geometric isomers thereof, i.e., cis and trans) wherein each R is independently hydrogen or hydrocarbyl of up to 8 carbon atoms, such as alkyl, alkaryl or aryl. In certain embodiments, at least one R is hydrogen, and both R may be hydrogen. Each R' is independently hydrogen or hydrocarbyl, for instance, lower alkyl of up to 7 carbon atoms (e.g., methyl, ethyl, butyl or heptyl). R" is independently aromatic (mononuclear or fused polynuclear) hydrocarbon, representative of an aromatic amine or polyamine as described below. The $\alpha,\beta$-unsaturated dicarboxylic acids, anhydrides or alkyl esters thereof typically contain up to 25 carbon atoms total, normally up to 15 carbon atoms. Examples include maleic acid or anhydride; benzyl maleic anhydride; chloro maleic anhydride; heptyl maleate; itaconic acid or anhydride; citraconic acid or anhydride, ethyl fumarate; fumaric acid, mesaconic acid; ethyl isopropyl maleate; isopropyl fumarate; hexyl methyl maleate; and phenyl maleic anhydride. These and other alpha, beta-unsaturated dicarboxylic compounds are well known in the art. Maleic anhydride, maleic acid and fumaric acid and the lower alkyl esters thereof are often used. Interpolymers derived from the mixtures of two or more of any of these can also be used.

Alternatively, the (OR') group in the above formula may contain more than 7 carbon atoms, being derived from a mixture of alcohols, some containing over 7 carbon atoms, and in such instances, the ester group may remain attached to the carboxy group during and after formation of the interpolymer. This procedure provides a method of introducing the desirable ester groups initially, and eliminates the need to introduce the ester groups in a separate subsequent step, which subsequent esterification step is described in greater detail below.

In one embodiment, the $\alpha,\beta$-unsaturated agent comprises a mixture of two or more components, which may be present in any amounts relative to one another.

Certain suitable interpolymers of this invention are those made by reacting maleic acid, or anhydride or the lower esters thereof, with styrene. If the interpolymer is prepared by the reaction of an acid or an anhydride, the resulting polymer can be converted to an ester-containing polymer by suitable esterification of the resulting interpolymer. Among suitable interpolymers, those which are made of maleic anhydride and styrene and have a RSV in the range of 0.03 or 0.05 to 0.8, or 0.08 to 0.5 or to 0.45, or 0.12 to 0.35 (as measured on the backbone polymer, that is, the polymer before esterification and reaction with the amine). Copolymers of maleic anhydride and styrene having a molar ratio of the maleic anhydride to styrene of about 1:1 are particularly useful. They can be prepared according to methods known in the art, as for example, free radical initiated (e.g., by benzoyl peroxide) solution polymerization. Suitable inter-polymerization techniques are well known in the art and are described in numerous U.S. patents including U.S. Pat. Nos. 2,938,016; 2,980,653; 3,085,994; 3,342,787; 3,418,292; 3,451,979; 3,536,461; 3,558,570; 3,702,300; 3,723,375; 3,933,761; 4,284,414, and 4,604,221.

The carboxy-containing interpolymers may also be prepared using one or more additional interpolymerizable comonomers. The additional comonomer is present in relatively minor proportions. Generally, the total amount is less than 0.3 mole, usually less than 0.15 mole of additional comonomers for each mole of either the olefin or the $\alpha,\beta$-unsaturated carboxylic acylating agent. Examples of additional comonomers include acrylamides, acrylonitrile, vinyl pyrrolidinone, vinyl pyridine, vinyl ethers, and vinyl carboxylates. In one embodiment, the additional comonomers are vinyl ethers or vinyl carboxylates. These materials are described in greater detail in the aforementioned U.S. Pat. No. 6,544,935.

Suitable interpolymers may be prepared from a vinyl aromatic monomer and aliphatic carboxylic acids or anhydrides and esters thereof. The vinyl aromatic monomer may be styrene or a substituted styrene (either ring substituted or substituted on the aliphatic —C═C group), and in one embodiment, styrene. In one embodiment, the aliphatic carboxylic acid or anhydride and esters thereof is at least one member selected from the group consisting of maleic acid or anhydride, itaconic acid or anhydride, fumaric acid, α-methylene glutaric acid, acrylic acid, methacrylic acid or an ester thereof or half acid-esters of the dibasic compounds. In one embodiment the interpolymer is derived from styrene and maleic anhydride. In another embodiment the interpolymer is derived from styrene, maleic anhydride and methacrylic acid or an ester thereof. In the latter embodiment, the mole ratio of styrene:maleic anhydride:methacrylic acid or ester thereof ranges of (1-3):(2-1):(0.01-0.3), such as (1-2):(1.5-1):(0.01-0.03), or alternatively 1:1:(0.03-0.08), or 1:1:0.05.

Another feature of the present invention is the molecular weight of the carboxy-containing interpolymer. The highest useful molecular weight for a given application may be limited due to other effects such as shear stability. Further, one skilled in the art would understand that the relationship between molecular weight and RSV, described below, is somewhat dependant on the nature and amounts of the alpha, beta-unsaturated acylating agent, alpha olefin, and unsaturated aromatic monomers as well as the nature and amounts of ester and carbonyl-amino groups contained in the final product.

In one aspect, the weight average molecular weight ($\overline{M}_w$) of the polymer (including the ester functionality, but, typically, excluding the amine component) can be 5,000 or 10,000 or 20,000 to 300,000; or 25,000 to 180,000; or 40,000 to 130,000, as measured by gel permeation chromatography with a polystyrene standard. Corresponding number average molecular weights ($\overline{M}_n$) can be 2500 or 5000 or 10,000 to 150,000; or 12,000 to 90,000; or 20,000 to 65,000. The molecular weight of the polymer containing the amine will be correspondingly somewhat higher and can be readily calculated on the basis of the amount and molecular weight of the amine.

The molecular weight, particularly of the interpolymer, can also be related to the viscosity. Whenever reference is made in this application to RSV or "reduced specific viscosity," the reference is to the interpolymer before it is esterified or reacted with the amine. The reduced specific viscosity is defined by $$RSV = \frac{\text{Relative Viscosity} - 1}{\text{Concentration}}$$

where concentration is expressed in g/dL. The relative viscosity is typically determined by measuring, by means of a dilution viscometer, the viscosity of a solution of 0.4 gram of the interpolymer in 100 mL of acetone and the viscosity of acetone at 30°±0.02° C. Interpolymers having RSV from 0.03 or 0.05 to 0.80 or 0.70 are among those suitable for the present invention. Other suitable values of RSV include 0.08 to 0.6 or 0.1 to 0.5 or 0.12 to 0.35.

Esterification

Esterification (or transesterification, when the interpolymer already contains ester groups and those of a different type are desired) of the interpolymers can be accomplished by heating any of the interpolymers (having the requisite RSV) and the desired alcohol(s) and alkoxylate(s) under conditions typical for effecting esterification. Such conditions include, for example, a temperature of at least 80° C., such as up to 150° C. or even more, provided that the temperature is maintained below the lowest decomposition temperature of any component of the reaction mixture or products thereof. Water or lower alcohol is normally removed as the esterification proceeds. These conditions may optionally include the use of a substantially inert, normally liquid, organic solvent or diluent such as mineral oil, toluene, benzene, xylene or the like and an esterification catalyst such as toluene sulfonic acid, sulfuric acid, aluminum chloride, boron trifluoride-triethylamine, methane sulfonic acid, trifluoro-methanesulfonic acid, hydrochloric acid, ammonium sulfate, and phosphoric acid. These conditions and variations thereof are well known in the art.

At least 5%, or in certain embodiments 10% to 20%, of the carboxy functions of the interpolymer remain un-converted to ester groups. (Most of these will be converted to nitrogen-containing groups.) An excess of alcohols and alkoxylates over the stoichiometric requirement for complete esterification of the carboxy functions may be used in the esterification process provided the ester content of the polymer remains at an appropriate range, e.g., within the 80 to 85% range. While excess of alcohols and alkoxylates or unreacted alcohols and alkoxylates need not be removed as such alcohols and alkoxylates can serve, for example, as diluent or solvent in the use of the esters, and similarly, optional reaction media, e.g., toluene, need not be removed as they can similarly serve as diluent or solvent in the use of the esters, it is common that unreacted alcohols, alkoxylates and diluents are removed by techniques such as distillation, that are well-known in the art.

In one embodiment of the invention, 20 or 30 to 100 mole %, alternatively 30 to 70 mole %, based on the total number of moles of carboxyl groups in the interpolymer contain ester groups having 12 to 19 carbon atoms in the alcohol group (that is, in the alcohol-derived or alkoxy portion of the ester) and 70 or 80 to 0 mole %, alternatively 80 to 30 mole %, based on the total number of moles of carboxyl groups in the interpolymer contain ester groups having 8 to 10 carbon atoms in the alcohol portion. In one embodiment, the ester contains at least 45 mole %, based on moles of carboxyl groups in said interpolymer, of ester groups containing from 12 to 18 carbon atoms in the alcohol portion. In an optional embodiment, the esterified interpolymer has up to 20 mole % or 0 to 5% or 1 to 2%, based on the total number of moles of carboxyl groups in the interpolymer, of ester groups having from 1 to 6 carbon atoms in the alcohol portion. In one embodiment, the compositions are substantially free of ester groups containing from 3 to 7 carbon atoms. The ester groups are usually formed by reacting the carboxy-containing interpolymer with alcohols although frequently, especially for lower alkyl esters, the ester group may be incorporated from one of the monomers used to prepare the interpolymer. Examples of useful alcohol reactants include butanol, heptanol, octanol, 2-ethylhexanol, decanol, dodecanol, tridecanol, tetradecanol, pentadecanol, hexadecanol, heptadecanol, and octadecanol One class of alcohols includes commercially available mixtures of alcohols. These include oxoalcohols which may comprise, for example, various mixtures of alcohols having from 8-24 carbon atoms. Of the various commercial alcohols useful in this invention, one contains 8 to 10 carbon atoms, and another 12 to 18 aliphatic carbon atoms. The alcohols may comprise, for example, octyl alcohol, decyl alcohol, dodecyl alcohol, tetradecyl alcohol, pentadecyl alcohol, and octadecyl alcohol. Several suitable sources of these alcohol mixtures are the technical grade alcohols sold under the name NEODOL® alcohols (Shell Oil Company, Houston, Tex.) and under the name ALFOL® alcohols (Sasol, Westlake, La.), and fatty alcohols derived from animal and vegetable fats and sold commercially by, for example, Henkel, Sasol, and Emery.

Tertiary alkanolamines, i.e., N,N-di-(lower alkyl)amino alkanolamines, are other alcohols that may be used to prepare the esterified interpolymers. Examples include N,N-dimethylethanolamine, N,N-diethylethanolamine, and 5-diethylamino-2-pentanol.

The amount and type of alcohols will affect the physical properties of the interpolymer composition. Solubility and viscosity, particularly low temperature viscosity, will be affected by the choice and amount of alcohols used. One skilled in the arts would recognize, for example, that the use of higher alcohols (containing more carbons) or a greater portion of higher alcohols will improve the material's solubility in a hydrocarbon medium. Longer hydrocarbyl groups, especially linear groups, typically of greater than 15 carbon atoms, are also known to interact with waxes in hydrocarbon oils to reduce the pour point and low temperature viscosity of the fluid, if present in the appropriate concentration. However, too much of these long linear groups may adversely affect the low temperature properties of the polymer, increasing the low temperature viscosity and pour point. The best composition of alcohols will therefore depend on the type and amount of alcohols used, the amount of the final polymer used in the blend composition, and the application in which the blend is used. In certain embodiments, the relative amounts by weight of various alcohols can be expressed by the ratios a:b:c=40 to 50:40 to 60:0 to 10 (or: 1 to 10), or a:b:c=20 to 40:55 to 75:0 to 5. In certain embodiments the ratio can be 45:45:5 or 39:59:2 or 24:74:2 or 30:68:2 or 0:97:3. In the preceding ratios, "a" is a mixture of $C_{8-10}$ alcohols, "b" is a mixture of $C_{12-18}$ alcohols, and "c" is a $C_4$ alcohol or a mixture of $C_{3-5}$ alcohols.

The esterified interpolymers may be mixed esters derived from a combination of alcohols including alcohols containing at least 7, often at least 12 carbon atoms (relatively high molecular weight alcohols) and alcohols containing less than 7 carbon atoms (relatively low molecular weight alcohols). Alcohols containing less than 7 carbon atoms, include methanol, ethanol, propanol, butanol, pentanol and hexanol, including isomers thereof. Mixed esters of the carboxy-containing interpolymer can be prepared by first esterifying the carboxy-containing interpolymer with the relatively high molecular weight alcohols then with the relatively low molecular weight alcohol in appropriate amounts, to convert approximately 80% to 90% of the carboxy groups of the interpolymer to ester groups. Further details of conducting the esterification can be found in the above-mentioned U.S. Pat. No. 6,544,935, column 11.

When utilizing a combination of high molecular weight and low molecular weight alcohols, the esterification may be carried out, for example, by initially esterifying the carboxy radicals with the higher molecular weight alcohols and then subsequently esterifying the partially-esterified carboxy-containing interpolymer with a low molecular weight, e.g., 1-6 carbon atoms, alcohol, to obtain a carboxy interpolymer having at least 80% of the ester groups high molecular weight esters and the balance of the ester groups being low molecular weight esters. For example, esterification with a combination of high and low molecular weight alcohols may be accomplished in sequence, first carrying out the esterification with the high molecular weight alcohol then esterifying the remaining carboxylic groups with the low molecular weight alcohol, to attain the desired degree of esterification.

The amine component, described below, will also be reacted with the initial carboxy-containing polymer, along with the alcohol components, by methods and in sequences to be discussed below.

The Amino Compound and Aromatic Amines

The carboxy-containing interpolymers contains a carbonyl-amino group. The carbonyl-amino groups include amides, imides, amidines, ammonium salts, amidic acid salts or mixtures thereof. Thus, use of the expressions "neutralize, neutralizing, etc" are not to be limiting to salt formation but refer to reaction of an amino compound with a carboxylic acid or functional derivative thereof. However, the word "condense" or "condensed," in the context of reaction with the amino compound, will be reserved for the reaction product of an amine with a carboxy acid, anhydride, or ester to yield a covalently bound species. These include amides and imides but do not include amidic salts. A carbonyl-amino group is typically derived from unesterified carboxylic acid or anhydride groups of the esterified interpolymer and an amino compound.

One feature of the instant invention is the extent of esterification and the extent of reaction of the unesterified carboxy groups of the carboxy-containing interpolymer with condensable aromatic amines. In a particularly advantageous embodiment of the invention the linkage is amide or imide, predominantly imide. Such linkages can be generically referred to as carbonyl-amino groups or linkages.

Ester groups and carbonyl-amino groups may be incorporated into the polymer in different ways and in different reaction order. In one embodiment most or all of each may be present prior to polymerization. That is, the alpha, beta-unsaturated acylating agent, or monomer, may be ester containing, carbonyl-amino containing, or both. Suitable monomers can contains both functionalities, or a mixture of monomers can be used in which each contains one of these functionalities. If only a portion of the alpha, beta-unsaturated acylating agent is an ester or carbonyl-amino, the remaining acid or anhydride groups can be further reacted after polymerization to convert these to esters or carbonyl-amino groups. Moreover, lower ester groups present on an alpha, beta-unsaturated acylating agent may be converted, if desired, to higher esters or to carbonyl-amino groups after the polymerization reaction. Alternatively, the alpha, beta-unsaturated acylating agent can be converted to ester and/or carbonyl-amino functionality after it has been incorporated into the interpolymers by reaction with alcohol and amine, being added and reacted sequentially in either order or simultaneously. In some instances, reaction with the amine occurs more readily undertaken prior to esterification.

The carboxylic derivative compositions of this invention are typically obtained by reacting the ester-containing copolymer, described above, or an acid- or anhydride containing precursor to the ester-containing polymer, with an aromatic amine containing at least one, and in certain embodiments exactly one, N—H group capable of condensing with the carboxylic acid functionality of the polymer, to form nitrogen-containing carboxylic derivatives of the present invention which contain dispersant functionality. The ester-containing interpolymers will typically contain a portion of un-esterified carboxylic functionality which is capable of reacting with an amine to form a carbonyl-amine group, although under suitable reaction conditions the amine can react with an ester function, displacing an alcohol moiety to yield a carbonyl-amine group.

The aromatic amine may be reacted to the interpolymer either prior to reaction with alcohols, after the reaction of the interpolymer with alcohols, or simultaneously with the reaction of alcohols. An inert solvent such as toluene or oil can be present if desired. In one embodiment a portion of the alcohol component is mixed with an anhydride-containing polymer, and thereafter the aromatic amine component is added. The amine can react spontaneously with the anhydride component, while the initial charge of alcohol serves to help facilitate reaction of the amine. After the amine has reacted, the remainder of the alcohol can be added. Further addition of an acid catalyst, such as methanesulfonic acid, can then catalyze the esterification with the alcohol charge. A subsequent charge of a relatively low molecular weight alcohol such as butanol can be supplied in order to assure substantially complete reaction of any remaining acid or anhydride groups on the polymer.

As another variation, one amine may be used prior to or during the reaction with alcohols and a second amine may be used thereafter. Such a subsequent reaction with amine may be desirable to consume any remaining unreacted carboxy acid or anhydride groups, much as the addition a low molecular weight alcohol, mentioned above. That is, if a relatively large aromatic amine is used, it may not be able to react with all of the carboxy acid or anhydride groups of the polymer. In that instance, a smaller amine from among those listed herein, such as aliphatic (non-aromatic) amines of up to 8 or 10 carbon atoms, or ammonia, or a hydrazine, can be used to further convert these to carbonyl-amino groups. Suitable amines for such use include aminopropylmorpholine and dimethylaminopropylamine. Dispersants and other materials containing amine functionality can also be used as a source of amine. For example, an aromatic diamine such as phenylenediamine can be reacted with a succinic anhydride or a hydrocarbyl succinic anhydride (e.g., polyisobutylene succinic anhydride) in a ratio which provides an aromatic compound with a single reactive (unblocked) amine group.

In yet another embodiment, a surfactant can be present as a contact promoter to ensure imidization of remaining anhydride groups of a previously esterified interpolymers resin. This general approach has been disclosed for other types of polymers in European Patent Publication EP 0 922 752 A2, in which 5-40% by weight of surfactant is used to solubilize an amine. Examples of suitable surfactants include ethoxylated nonylphenols and more generally reaction products of aliphatic or aromatic hydroxy compounds with ethylene oxide, propylene oxide, or mixtures thereof.

Other specific means of linkage of an aromatic amine onto the carboxy-containing interpolymers chain are also contemplated as included within the scope of the invention by the expression "a portion of said acylating agent monomers is condensed with at least one aromatic amine." For example, amine functionality can be introduced into the polymer by including an amine-containing comonomer in the reaction mixture when the interpolymers is initially prepared. The amine-containing comonomer can be the reaction or condensation product of an amine with the alpha, beta-unsaturated acylating agent described above. For instance, the condensation product of maleic anhydride and an aromatic amine such as 4-aminodiphenylamine or 4-phenylazoaniline can be employed. The latter materials is known and bears the CAS number [16201-96-0]. It is believed to have the structure

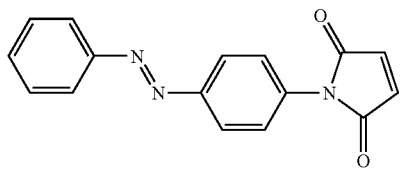

4-phenylazomaleinanil or 1-(4-pheylazo-phenyl)-pyrrole-2,5-dione
(including geometric and positional isomers thereof). Similarly, the adduct with 4-aminodiphenylamine and methods of its preparation are reported in U.S. Patent Application Publication 2004/0043909; see for instance Example 1 on page 15. In said application, the amine-containing monomers are grafted onto a base polymer, such as an olefin copolymer. In the context of the present invention, they may also be present during the copolymerization and thus be incorporated along with other maleic anhydride based moieties within the polymer chain itself.

In another example of such an alternative route, a hydroxyamide can be esterified with the carboxy groups on the polymer chain. Exemplary hydroxyamides can be represented by

and

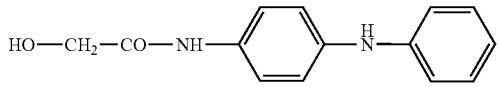

where the Ar is an aromatic moiety of the aromatic amine (which may contain additional nitrogen or other functionality) and R is an alkylene or hydrocarbylene linking group. Alternatively, a hydroxyacid can be first esterified with a carboxy group on the backbone interpolymers and thereafter reacted with an aromatic amine; in either case the hydroxyacid serves as a linking group between the polymer chain and the aromatic amine.

Aromatic amines include those which can be represented by the general structure $NH_2$—Ar, where Ar is an aromatic group, including nitrogen-containing aromatic groups and Ar groups including any of the following structures

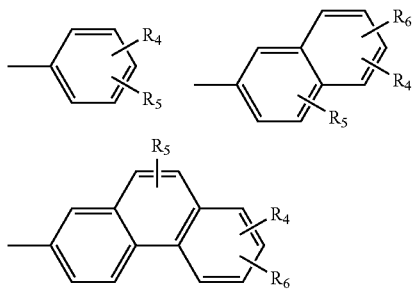

as well as multiple non-condensed aromatic rings. In these and related structures, $R_4$, $R_5$, and $R_6$ can be independently, among other groups disclosed herein, —H, —$C_{1-18}$ alkyl groups, nitro groups, —NH—Ar, —N=N—Ar, —NH—CO—Ar, —OOC—Ar, —OOC—$C_{1-18}$ alkyl, —COO—$C_{1-18}$ alkyl, —OH, —O—$(CH_2CH_2$—O$)_n C_{1-18}$ alkyl groups, and —O—$(CH_2CH_2O)_n$Ar (where n is 0 to 10).

Aromatic amines include but are not limited to those amines wherein a carbon atom of the aromatic ring structure is attached directly to the amino nitrogen. The amines may be monoamines or polyamines. The aromatic ring will typically be a mononuclear aromatic ring (i.e., one derived from benzene) but can include fused aromatic rings, especially those derived from naphthalene. Examples of aromatic amines include aniline, N-alkylanilines such as N-methyl aniline, and N-butylaniline, di-(para-methylphenyl)amine, naphthylamine, 4-aminodiphenylamine, N,N-dimethylphenylenediamine, 4-(4-nitrophenyl-azo)aniline (disperse orange 3), sulfamethazine, 4-phenoxyaniline, 3-nitroaniline, 4-aminoacetanilide (N-(4-aminophenyl)acetamide)), 4-amino-2-hydroxy-benzoic acid phenyl ester (phenyl amino salicylate), N-(4-aminophenyl)-benzamide, various benzylamines (substituted φ-$CH_2NH_2$) such as 2,5-dimethoxybenzylamine, 4-phenylazoaniline, and substituted versions of these. Other examples include para-ethoxyaniline, para-dodecylaniline, cyclohexyl-substituted naphthylamine, and thienyl-substituted aniline. Examples of other suitable aromatic amines include amino-substituted aromatic compounds and amines in which the amine nitrogen is a part of an aromatic ring, such as 3-aminoquinoline, 5-aminoquinoline, and 8-aminoquinoline. Also included are aromatic amines such as 2-aminobenzimidazole, which contains one secondary amino group attached directly to the aromatic ring and a primary amino group attached to the imidazole ring. Other amines include N-(4-anilinophenyl)-3-aminobutanamide (i.e., φ-NH-φ-NH—$COCH_2CH(CH_3)NH_2$). Yet other amines include 2,5-dimethoxybenzylamine Additional aromatic amines and related compounds are disclosed in U.S. Pat. Nos. 6,107,257 and 6,107,258; some of these include aminocarbazoles, aminoindoles, aminopyrroles, amino-indazolinones, aminoperimidines, mercaptotriazoles, aminophenothiazines, aminopyridiens, aminopyrazines, aminopyrimidines, pyridines, pyrazines, pyrimidines, aminothiadiazoles, aminothiothiadiazoles, and aminobenzotriaozles. Other suitable amines include 3-amino-N-(4-anilinophenyl)-N-isopropyl butanamide, and N-(4-anilinophenyl)-3-{(3-aminopropyl)-(cocoalkyl)amino} butanamide. Other aromatic amines which can be used include various aromatic amine dye intermediates containing multiple aromatic rings linked by, for example, amide structures. Examples include materials of the general structure

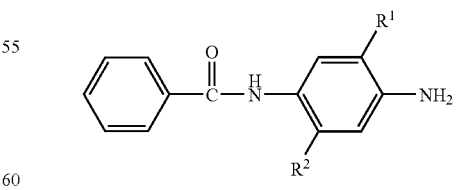

and isomeric variations thereof, where $R^1$ and $R^2$ are independently alkyl or alkoxy groups such as methyl, methoxy, or ethoxy. In one instance, $R^1$ and $R^2$ are both —$OCH_3$ and the material is known as Fast Blue RR [CAS#6268-05-9]. In another instance, $R^1$ is —$OCH_3$ and $R^2$ is —$CH_3$, and the material is known as Fast Violet B [99-21-8]. When both $R^1$ and $R^2$ are ethoxy, the material is Fast Blue BB [120-00-3]. U.S. Pat. No. 5,744,429 discloses other aromatic amine compounds, particularly aminoalkylphenothiazines. N-aromatic substituted acid amide compounds, such as those disclosed in U.S. Patent application 2003/0030033 A1, may also be used for the purposes of this invention. Suitable aromatic amines include those in which the amine nitrogen is a substituent on an aromatic carboxyclic compound, that is, the nitrogen is not $sp^2$ hybridized within an aromatic ring. The aromatic amine will typically have an N—H group capable of condensing with a carboxylic acid acylating agent.

Certain aromatic amines are commonly used as antioxidants. Of particular importance in that regard are alkylated diphenylamines such as nonyldiphenylamine and dinonyldiphenylamine. To the extent that these materials will condense with the carboxylic functionality of the polymer chain, they are also suitable for use within the present invention. However, it is believed that the two aromatic groups attached to the amine nitrogen may lead to steric hindrance and reduced reactivity. Thus, suitable amines include those having a primary nitrogen atom (—$NH_2$) or a secondary nitrogen atom in which one of the hydrocarbyl substituents is a relatively short chain alkyl group, e.g., methyl. Among such aromatic amines are 4-phenylazoaniline, 4-aminodiphenylamine, 2-aminobenzimidazole, and N,N-dimethylphenylenediamine. Some of these and other aromatic amines may also impart antioxidant performance to the polymers, in addition to dispersancy and other properties.

In one embodiment of the invention, the amine component of the reaction product further comprises an amine having at least two N—H groups capable of condensing with the carboxylic functionality of the polymer. This material is referred to hereinafter as a "linking amine" as it can be employed to link together two of the polymers containing the carboxylic acid functionality. It has been observed that higher molecular weight materials may provide improved performance, and this is one method to increase the material's molecular weight. The linking amine can be either an aliphatic amine or an aromatic amine; if it is an aromatic amine, it is considered to be in addition to and a distinct element from the aromatic amine described above, which need have and typically will have only one condensable or reactive NH group, in order to avoid excessive crosslinking of the polymer chains. Examples of such linking amines include ethylenediamine, phenylenediamine, and 2,4-diaminotoluene; others include propylenediamine, hexamethylenediamine, and other α,ω-polymethylenediamines. The amount of reactive functionality on such a linking amine can be reduced, if desired, by reaction with less than a stoichiometric amount of a blocking material such as a hydrocarbyl-substituted succinic anhydride.

The total amount of the amine and alcohol condensed onto the carboxylic acid functionality of the polymer is typically about 1 equivalent per equivalent of carboxy compound on the polymer chain as described above, that is, to react with substantially all of the reactive carboxy functionality on the polymer. If more than a stoichiometric amount of amine or alcohol is used, excess may remain and may need to be removed from the product. If less than a stoichiometric amount is used, residual unreacted acid or anhydride functionality may remain in the polymer which may likewise be undesirable. In certain embodiments, the total acid number of the resulting polymer is less than 10, or less than 6, or less than 4.

The carboxylic derivative compositions produced by reacting the carboxy-containing polymer of the invention and the amines described above are acylated amines which can include amine salts, amides, imides and imidazolines as well as mixtures thereof. The carboxy-containing polymer which reacts with the aromatic amines may be either interpolymer polymerized from monomers (i) and (ii), prior to any condensation reactions, or it can be the corresponding polymer which has been condensed with some or all of the alcohol component described above. In either case, this polymer will contain groups or residual groups which react with amines, including carboxy acids, anhydrides, or esters. To further react these carboxylic derivative compositions with amines, one or more of the carboxylated copolymers and one or more amines can be heated, optionally in the presence of a normally liquid, substantially inert organic liquid solvent/diluent, at temperatures of 80° C. up to the decomposition point of any of the reactants or the product, but normally at temperatures of 100° C. to 300° C., provided 300° C. does not exceed the decomposition point of a reactant or the product. Temperatures of 125° C. to 250° C. are commonly used. If more than one amine is used, the amines can be added and reacted in either order, or simultaneously.

In one embodiment, the amine moiety comprises 3 to 25 percent by weight of the interpolymers composition; in other embodiments 5 to 20% or 6 to 15%. In one embodiment, greater than 10 mole percent of the carboxylic functionality will be condensed with the aromatic amine component. The majority of carboxylic groups on the polymer will normally be converted to non-acidic functionalities, such as ester, imide, or amide. It is noted that condensation with an amine to form an imide versus an amide consume different amounts of carboxyl per condensable nitrogen. Secondary amines (R—N(R')H) may react with a carboxy compound (acid, anhydride, or ester) to form amides in which one nitrogen is reacted with one carboxy group. Primary amines (R—$NH_2$) may react to form either the amide or imide, particularly when reacting with an anhydride: formation of an imide (R—C(=O)—NR—C(=O)—R) consumes two carboxyl groups per nitrogen. This difference should be taken into account when selecting the amount of amine and alcohol for reaction.

If a diamine is used in addition to an aromatic monoamine, the diamine can be present in an amount of 1 mole (that is, 2 equivalents) of condensable amine functionality per 5 to 6 moles of carboxy compound on the polymer chain. Thus, the diamine can be 1 mole (2 equivalents) per 4 to 5 moles of aromatic monoamine. It is desirable that any linking amine be used in an amount such that the anhydrides (or carboxy materials) on any given polymer chain react with an amine nitrogen from only one linking amine molecule, so as to minimize the likelihood of gelling of the polymer.

The Oil of Lubricating Viscosity

The lubricating compositions of this invention employ an oil of lubricating viscosity, including natural or synthetic lubricating oils and mixtures thereof. Natural oils include animal oils and vegetable oils (e.g. castor oil, lard oil) as well as mineral lubricating oils such as liquid petroleum oils and solvent-treated or acid treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins and mixtures thereof, alkylbenzenes, polyphenyl, (e.g., biphenyls, terphenyls, alkylated polyphenyls), alkylated diphenyl ethers and alkylated diphenyl sulfides and the derivatives, analogs and homologues thereof. Alkylene oxide polymers and interpolymers and derivatives thereof where their terminal hydroxyl groups have been modified by processes such as esterification or etherification, constitute another useful class of known synthetic lubricating oils. Another suitable class of synthetic lubricating oils comprises the esters of di- and polycarboxylic acids and those made from $C_5$ to $C_{20}$ monocarboxylic acids and polyols and polyethers. Other synthetic lubricating oils include liquid esters of phosphorus-containing acids, polymeric tetrahydrofurans, silicon-based oils such as the polyalkyl-, polyaryl-, polyalkoxy-, or polyaryloxy-siloxane oils and silicate oils. Synthetic oils also include those produced by a gas-to-liquid (GTL) or Fischer-Tropsch process including hydroisomerized oils from a GTL process.

Unrefined, refined and rerefined oils, either natural or synthetic (as well as mixtures of two or more of any of these) of the type disclosed herein-above can be used in the compositions of the present invention. Unrefined oils are those obtained directly from natural or synthetic sources without further purification treatment. Refined oils are similar to the unrefined oils except they have been further treated in one or more purification steps to improve one or more properties. Refined oils include solvent refined oils, hydrorefined oils, hydrofinished oils, hydrotreated oils, and oils obtained by hydrocracking and hydroisomerization techniques.

Oils of lubricating viscosity can also be defined as specified in the American Petroleum Institute (API) Base Oil Interchangeability Guidelines. The five base oil groups are as follows:

| Base Oil Category | Sulfur (%) | | Saturates (%) | Viscosity Index |
|---|---|---|---|---|
| Group I | >0.03 | and/or | <90 | 80-120 |
| Group II | <0.03 | and | >90 | 80-120 |
| Group III | <0.03 | and | >90 | >120 |
| Group IV | All polyalphaolefins (PAOs) | | | |
| Group V | All others not included in Groups I, II, III, or IV | | | |

Groups I, II, and III are mineral oil base stocks. Group III base oils are also sometimes considered to be synthetic base oils.

Other Additives

The lubricating oil compositions of this invention may contain other components. The use of such additives is optional and the presence thereof in the compositions of this invention will depend on the particular use and level of performance required. Thus the other additive may be included or excluded. The compositions may comprise a metal salt, frequently a zinc salt of a dithiophosphoric acid. Zinc salts of dithiophosphoric acids are often referred to as zinc dithiophosphates or zinc O,O'-dihydrocarbyl dithiophosphates and are sometimes referred to by the abbreviations ZDP, ZDDP, or ZDTP. One or more zinc salts of dithiophosphoric acids may be present in a minor amount to provide additional extreme pressure, anti-wear and anti-oxidancy performance. Other metal salts of dithiophosphoric acids, such as copper or antimony salts are known and may be included in the lubricating oil compositions of this invention.

Other additives that may optionally be used in the lubricating oils of this invention include detergents, dispersants, viscosity improvers, oxidation inhibiting agents, pour point depressing agents, extreme pressure agents, anti-wear agents, color stabilizers, friction modifiers (e.g., sulfurized olefins, fatty esters), and anti-foam agents. The above-mentioned dispersants and viscosity improvers may be used in addition to the compositions of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, and molybdenum compounds.

Auxiliary viscosity improvers (also sometimes referred to as viscosity index improvers or viscosity modifiers) may be included in the compositions of this invention. Viscosity improvers are usually polymers, including polyisobutenes, polymethacrylic acid esters, diene polymers, polyalkyl styrenes, esterified styrene-maleic anhydride copolymers, alkenylarene-conjugated diene copolymers and polyolefins. Multifunctional viscosity improvers, other than those of the present invention, which also have dispersant and/or antioxidancy properties are known and may optionally be used in addition to the products of this invention. Among the suitable auxiliary viscosity modifiers which may be employed are hydrogenated styrene/diene copolymers, such as hydrogenated styrene/isoprene block copolymers available under the trade name Septon™.

Detergents are typically overbased materials. Overbased materials, otherwise referred to as overbased or superbased salts, are generally single phase, homogeneous Newtonian systems characterized by a metal content in excess of that which would be present for neutralization according to the stoichiometry of the metal and the particular acidic organic compound reacted with the metal. The overbased materials are prepared by reacting an acidic material (typically an inorganic acid or lower carboxylic acid, for instance, carbon dioxide) with a mixture comprising an acidic organic compound, a reaction medium comprising at least one inert, organic solvent (e.g., mineral oil, naphtha, toluene, xylene) for said acidic organic material, a stoichiometric excess of a metal base, and a promoter such as a phenol or alcohol. The acidic organic material will normally have a sufficient number of carbon atoms to provide a degree of solubility in oil. The amount of excess metal is commonly expressed in terms of metal ratio. The term "metal ratio" is the ratio of the total equivalents of the metal to the equivalents of the acidic organic compound. A neutral metal salt has a metal ratio of one. A salt having 4.5 times as much metal as present in a normal salt will have metal excess of 3.5 equivalents, or a ratio of 4.5.

Such overbased materials are well known to those skilled in the art. Patents describing techniques for making basic salts of sulfonic acids, carboxylic acids, phenols, phosphonic acids, salixarenes, and mixtures of any two or more of these include U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109.

Dispersants are well known in the field of lubricants and include primarily what is known as ashless-type dispersants. Ashless type dispersants are characterized by a polar group attached to a relatively high molecular weight hydrocarbon chain. Typical ashless dispersants include N-substituted long chain alkenyl succinimides, having a variety of chemical structures including typically

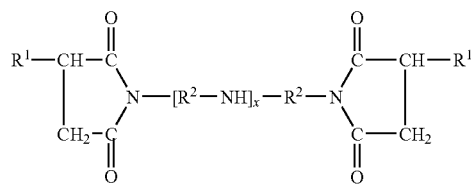

where each $R^1$ is independently an alkyl or alkenyl group (which may bear more than one succinimide group), frequently a polyisobutyl group with a molecular weight of 500-5000, and R2 are alkylene groups, commonly ethylene ($C_2H_4$) groups. Such molecules are commonly derived from reaction of an alkenyl acylating agent with a polyamine, and a wide variety of linkages between the two moieties is possible beside the simple imide structure shown above, including a variety of amides and quaternary ammonium salts. Succinimide dispersants are more fully described in U.S. Pat. Nos. 4,234,435 and 3,172,892. Particularly useful succinimide dispersants are those having a N:CO ratio of greater than 1:1, that is, with overall excess nitrogen functionality derived from the polyamine, compared with the carbonyl functionality derived from the succinic acid groups. Such materials may also be described as high nitrogen dispersants, containing at least 1.6% or at least 2% nitrogen in the dispersant (on an active chemical, oil-free basis) and having a relatively high total base number (TBN) of at least 30, 40, or even 50 (mg equivalent KOH per gram of sample, active chemical basis). Desirable materials are also relatively high molecular weight dispersants, having, for instance alkyl or hydrocarbyl (polymer) groups with $\overline{M}_n$ of greater than 1300.

Another class of ashless dispersant is high molecular weight esters. These materials are similar to the above-described succinimides except that they may be seen as having been prepared by reaction of a hydrocarbyl acylating agent and a polyhydric aliphatic alcohol such as glycerol, pentaerythritol, or sorbitol. Such materials are described in more detail in U.S. Pat. No. 3,381,022.

Another class of ashless dispersant is Mannich bases. These are materials which are formed by the condensation of a higher molecular weight, alkyl substituted phenol, an alkylene polyamine, and an aldehyde such as formaldehyde. Such materials may have the general structure

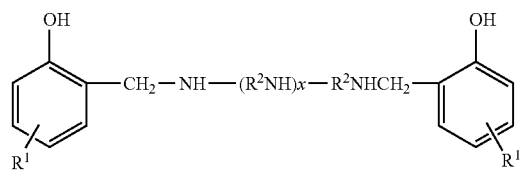

(including a variety of isomers other variations apparent to those skilled in the art) and are described in more detail in U.S. Pat. No. 3,634,515.

Other dispersants include polymeric dispersant additives, which are generally hydrocarbon-based polymers which contain polar functionality to impart dispersancy characteristics to the polymer.

Dispersants can also be post-treated by reaction with any of a variety of agents. Among these are urea, thiourea, dimercaptothiadiazoles, carbon disulfide, aldehydes, ketones, carboxylic acids, hydrocarbon-substituted succinic anhydrides, nitriles, epoxides, boron compounds, and phosphorus compounds. References detailing such treatment are listed in U.S. Pat. No. 4,654,403.

The above-illustrated additives may each be present in lubricating compositions at a concentration of as little as 0.001% by weight, usually 0.01% to 20% by weight. In most instances, they each contribute 0.1% to 10% by weight, more often up to 5% by weight.

Additive Concentrates

The various additives described herein can be added directly to the lubricant. In certain embodiments, however, they are diluted with a concentrate-forming amount of a substantially inert, normally liquid organic diluent such as mineral oil or a synthetic oil such as a polyalphaolefin to form an additive concentrate. These concentrates usually comprise 0.1 to 80% by weight of the compositions of this invention and may contain, in addition, one or more other additives known in the art or described hereinabove. Concentrations such as 15%, 20%, 30% or 50% of the additives or higher may be employed. By a "concentrate forming amount" is generally mean an amount of oil or other solvent less than the amount present in a fully formulated lubricant, e.g., less than 85% or 80% or 70% or 60%. Additive concentrates can be prepared by mixing together the desired components, often at elevated temperatures, usually up to 150° C. or 130° C. or 115° C.

Lubricating Oil Compositions

The instant invention also relates to lubricating oil compositions containing the amine-containing polymeric compositions of the invention. The amount of polymer contained in a fully formulated lubricant is typically 0.1 and 10% by weight, alternatively 0.5 to 6% or 1 to 3% by weight. As noted hereinabove, the compositions of this invention may be blended directly into an oil of lubricating viscosity or, more often, are incorporated into an additive concentrate containing one or more other additives which in turn is blended into the oil.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

All "Parts" in the following examples are parts by weight.

Example 1

A reactor is charged with 2285.6 parts of a 9.9% solids in toluene slurry of maleic anhydride/styrene (1:1 mole ratio) copolymer having RSV=0.12 and 194 parts of diluent oil. The materials are heated to 135° C. with nitrogen blowing while removing 1700 parts toluene. A mixture of 90 parts Alfol™ 810 and 20.6 parts aminodiphenylamine is added to the reaction. A rise in viscosity is observed and stirring is stopped. Diluent oil (50 parts) is added to the reaction. The heat is removed, and the reaction is left under nitrogen for 15 hours. The reaction is slowly heated to 100° C., and 300 parts xylene is added. Alfol™ 1218 (135 parts) is added. Stirring is resumed. The reaction is heated to 145° C. for 6 hours. Methanesulfonic acid (17.1 parts of a 50% aqueous solution) is added, and the reaction is stirred at 145° C. for 15 hours. An aliquot has total acid number=8.33 and strong acid number=5.57. The reaction is set to heat to 150° C., and 5.8 parts sodium hydroxide (50% aqueous solution) is added over thirty minutes via addition funnel. Nonyldiphenylamine (2 parts) is added, and the reaction is stirred for thirty minutes. The solvent is removed at 150° C. and 2.7 kPa (20 mmHg). The viscous material will not pass through filtration through a pad of diatomaceous earth. The black glassy solid is diluted to 53% in toluene. Total acid number=13.2.

Example 2

A reactor is charged with 2100 parts of a 13.2% solids in toluene slurry of a maleic anhydride/styrene (1:1 mole ratio)

copolymer having RSV=0.12, and 275 parts Alfol™ 1218. The reaction is heated to 135° C. under nitrogen flow, and toluene (approximately 800 parts) is removed over six hours. Methanesulfonic acid (14.3 parts) and Alfol™ 810 (181.2 parts) are charged over 30 minutes via addition funnel. The reaction is held for 10 hours and water is removed via water/toluene azeotrope. Xylene (200 parts) is charged to the reaction. The reaction is heated to 150° C. and held at temperature for six hours. The reaction is neutralized with 15 parts 50% aqueous sodium hydroxide. The reaction is held for 30 minutes. Aminodiphenylamine (25.1 parts) and ethoxylated nonylphenol (10 parts) are mixed and charged to the reaction. The reaction is held at 150° C. for 24 hours. Butanol (7.11 parts) is charged to the reaction. The reaction is held for two hours. Alkyl diphenylamine (3.71 parts) is charged to the reaction and allowed to mix over fifteen minutes. A 100N Group 1 base oil (496.5 parts) is charged to the reaction. The reaction is held 150° C. for thirty minutes. The reaction is cooled to 135 C. Volatile materials are removed by distillation under vacuum at 2.7 kPa (20 mm Hg). The reaction is filtered through diatomaceous earth and a cloth pad.

Example 3

A 12 L round bottom reactor flask is charged with 7831.5 parts of a 13.2% solids in toluene slurry of a maleic anhydride/styrene (1:1 mole ratio) copolymer having RSV=0.12. Toluene is removed by distillation at 120° C. To the reaction is added 1230 part of a 100N Group 1 base oil, 604 parts Alfol™ 810, and 83.8 parts aminodiphenylamine. The reaction is heated to 135° C., under nitrogen flow, and held for approximately 24 hours. To the reaction is added 916.8 parts of Alfol™ 1218 and 47.7 parts of methanesulfonic acid (drop wise). The temperature is increased to 150° C. and water is removed via water/toluene azeotrope over 24 hours. Approximately 28 parts water is recovered. Butanol (23.7 parts) is added and the reaction is held at 150° C. for 6 hours. An aliquot has total acid number=3.27, a strong acid number=2.61, and net=0.66. To the reaction is added 12.36 parts of alkyl diphenylamine which is mixed for fifteen minutes. The reaction is cooled to 135° C. Volatile materials are removed by distillation under vacuum at 2.7 kPa (20 mm Hg). The reaction is filtered through diatomaceous earth and a cloth pad.

Example 4

A 1-L round bottom reactor flask is charged with 500 parts of a 12.2% solids in toluene slurry of a maleic anhydride/styrene (1:1 mole ratio) copolymer having RSV=0.42. Toluene is removed by distillation at 120° C. To the reaction is added 79.3 parts of a 100N Group 1 base oil, 40.7 parts of Alfol™ 810, and 0.72 parts of aminodiphenylamine. The reaction is heated to 135° C., under nitrogen flow, and held for approximately 24 hours. To the reaction is added 62.4 parts of Alfol™ 1218 and 4.6 parts of aqueous methanesulfonic acid (drop-wise). The temperature is increased to 150° C. and water is removed via water/toluene azeotrope over 24 hours. The reaction mixture becomes viscous and approximately 100 mL of xylenes is added to facilitate stirring. Butanol (1.63 parts) is added and the reaction is held at 150° C. for 1 additional hour. An aliquot has a total acid number=4.2, a strong acid number=3.11, and net=1.1. To the reaction is added 1.9 parts of a 50% aqueous sodium hydroxide solution drop wise and mixed for 1 additional hour. Volatile materials are removed by distillation under vacuum at 4.0 kpa (30 mm Hg). The reaction is filtered hot through diatomaceous earth and a cloth pad.

Example 5

Example 4 is substantially repeated except that the amount of Alfol 810 is 39.2 parts, the Alfol 1218 is 60 parts, the aminodiphenylamine is 2.8 parts and the butanol is 1.48 parts. An aliquot has a total acid number=6.8 and a strong acid number=5.3.

Example 6

A reactor is charged with 7387.0 parts of a 13.2% solids in toluene slurry of a maleic anhydride/styrene (1:1 mole ratio) copolymer having RSV=0.12. Toluene is removed by distillation at 120° C. To the reaction is added 1796.0 parts of a 100N Group 1 base oil, 850.7 parts Alfol™ 810, and 59.96 parts aminodiphenylamine. The reaction is heated to 135° C., under nitrogen flow, and held for approximately 24 hours. To the reaction is added 1302.7 parts of Alfol™ 1218 and 70.31 parts of methanesulfonic acid (drop wise). The temperature is increased to 150° C. and water is removed via water/toluene azeotrope over 24 hours. Approximately 97 parts water is recovered. Butanol (48.6 parts) is added and the reaction is held at 150° C. for 3 hours. An aliquot has total acid number=8.4 and a strong acid number=4.27. Add 35.0 parts of a 50% aqueous sodium hydroxide solution and allow the reaction to mix at 150° C. for 2 hours. The reaction is cooled to 135° C. Volatile materials are removed by distillation under vacuum at 2.7 kPa (20 mm Hg). The reaction is filtered through diatomaceous earth and a cloth pad.

Example 7

Example 4 is substantially repeated where the amount of Alfol 810 is 33.78 parts, the Alfol 1218 is 51.27 parts, the aminodiphenylamine is 5.36 parts and the butanol is 1.35 parts. The maleic anhydride/styrene copolymer charge is 500 parts, having RSV 0.12, of a 13.2% solids toluene slurry. An aliquot has total acid number=6.7 and a strong acid number=2.5.

Example 8

Example 4 is substantially repeated where the amount of Alfol 810 is 31.65 parts, the Alfol 1218 is 48.11 parts, the Group 1 100N base oil is 69.4 parts, the aminodiphenylamine is 9.0 parts and the butanol is 1.35 parts. The maleic anhydride/styrene copolymer charge is 500 parts, having RSV 0.12, of a 13.2% solids toluene slurry. An aliquot has total acid number=6.4 and a strong acid number=5.8

Example 9

A reactor is charged with 7000 parts of a 18.92% solids in toluene slurry of a maleic anhydride/styrene (1:1 mole ratio) copolymer having RSV=0.12. Toluene is removed by distillation at 120° C. To the reaction is added 1643.3 parts of a 100N Group 1 base oil, 749.1 parts Alfol 810, and 212.9 parts aminodiphenylamine. The reaction is heated to 135° C., under nitrogen flow, and held for approximately 24 hours. To the reaction is added 1138.6 parts of Alfol 1218 and 92.0 parts of methane sulfonic acid (drop wise). The temperature is increased to 150° C. and water is removed via water/toluene azeotrop over 24 hours. Approximately 102.3 parts water is recovered. Butanol (29.4 parts) is added and the reaction is held at 150° C. for 3 hours. An aliquot has total acid number=6.4, a strong acid number=5.8, and net=0.4. Add 24.7 parts of a 50% aqueous sodium hydroxide solution and allow the reaction to mix at 150° C. for 3 hours. The reaction is cooled to 135 C. Volatile materials are removed by distillation under vacuum at 2.70 kPa (20 mm Hg). The reaction is filtered through diatomaceous earth and a cloth pad.

Example 10

Example 4 is substantially repeated where the amount of Alfol 810 is 35.53 parts, the Alfol 1218 is 53.92 parts, the Group 1 100N base oil is 71.35 parts, the aminodiphenylamine is 3.0 parts and the butanol is 1.35 parts. The maleic anhydride/styrene copolymer charge is 500 parts, having RSV 0.12, of a 11.2% solids toluene slurry.

Example 11

Example 4 is substantially repeated where the amount of Alfol 810 is 37.32 parts, the Alfol 1218 is 56.55 parts, the Group 1 100N base oil is 76.9 parts, the aminodiphenylamine is 5.8 parts and the butanol is 1.47 parts.

Example 12

Example 4 is substantially repeated where the amount of Alfol 810 is 36.95 parts, the Alfol 1218 is 56.14 parts, the Group 1 100N base oil is 72.64 parts, the aminodiphenylamine is 2.0 parts and the butanol is 1.4 parts. The maleic anhydride/styrene copolymer charge was 500 parts, having RSV 0.12, of a 11.2% solids toluene slurry.

Example 13

A reactor is charged with 7342.5 parts of a 16.4% solids in toluene slurry of a maleic anhydride/styrene copolymer having RSV=0.36. Toluene is removed by distillation at 120° C. To the reaction is added 1492.2 parts of a 100N Group 1 base oil, 679.5 parts of Alfol 810, and 193.4 parts of aminodiphenylamine. Additional 100N Group 1 base oil (1537 parts) and Alfol 1218 (1033.1 parts) are added. The mixture is heated to 135° C. under nitrogen flow and held for approximately 24 hours. To the reaction is added 64.25 parts methanesulfonic acid (drop wise). The temperature is increased to 150° C. and water is removed via water/toluene azeotrope over 24 h. Approximately 150 parts water is recovered. Butanol (26.6 parts) is added and the reaction held at 150° C. for 6 hours. An aliquot has total acid number=4.3 and a strong acid number=1.2 Aqueous NaOH (50%) (11.2 parts) is added and stirred 2 hours. The reaction is cooled to 135° C. Volatile materials are removed by distillation under vacuum at 2.7 kPa (20 mm Hg). The reaction is filtered through a cloth pad.

Example 14

A reactor is charged with 7000 parts of a 18.92% solids in toluene slurry of a maleic anhydride/styrene (1:1 mole ratio) copolymer having RSV=0.07. Toluene is removed by distillation at 120° C. To the reaction is added 1643.3 parts of a 100N Group 1 base oil, 749.1 parts Alfol 810, and 212.9 parts aminodiphenylamine. The reaction mixture is heated to 135° C., under nitrogen flow, and held for approximately 24 hours. To the reaction mixture, is added 1138.6 parts of Alfol 1218 and 92.0 parts of methane sulfonic acid (drop wise). The temperature is increased to 150° C. and water is removed via water/toluene azeotrope over 24 hours. Approximately 102.3 parts water is recovered. Butanol (29.4 parts) is added and the reaction is held at 150° C. for 3 hours. Add 24.7 parts of a 50% aqueous sodium hydroxide solution and allow the reaction to mix at 150° C. for 3 hours. The reaction is cooled to 135 C. Volatile materials are removed by distillation under vacuum at 2.7 kPa (20 mm Hg). The reaction is filtered through diatomaceous earth and a cloth pad.

Example 15

A reactor is charged with 7000 parts of a 18.92% solids in toluene slurry of a maleic anhydride/styrene (1:1 mole ratio) copolymer having RSV=0.70. Toluene is removed by distillation at 120° C. To the reaction is added 1643.3 parts of a 100N Group 1 base oil, 749.1 parts Alfol 810, and 212.9 parts aminodiphenylamine. The reaction is heated to 135° C., under nitrogen flow, and held for approximately 24 hours. To the reaction is added 1138.6 parts of Alfol 1218 and 92.0 parts of methanesulfonic acid (drop wise). The temperature is increased to 150° C. and water is removed via water/toluene azeotrope over 24 hours. Approximately 102.3 parts water is recovered. Butanol (29.4 parts) is added and the reaction is held at 150° C. for 3 hours. Add 24.7 parts of a 50% aqueous sodium hydroxide solution and allow the reaction to mix at 150° C. for 3 hours. The reaction is cooled to 135° C. Volatile materials are removed by distillation under vacuum at 2.7 kPa (20 mm Hg). The reaction is filtered through diatomaceous earth and a cloth pad.

Example 16

A reactor is charged with 2005 parts of a maleic anhydride/styrene (2:1 mole ratio) copolymer. Toluene is added, approximately 1000 parts, and the polymer is dispersed. To the reaction mixture is added 1643.3 part of a 100N Group 1 base oil, 749.1 parts Alfol 810, and 212.9 parts aminodiphenylamine. The reaction is heated to 135° C., under nitrogen flow, and held for approximately 24 hours. To the reaction mixture is added 1138.6 parts of Alfol 1218 and 92.0 parts of methanesulfonic acid (drop wise). The temperature is increased to 150° C. and water is removed via water/toluene azeotrope over 24 hours. Approximately 102.3 parts water is recovered. Butanol (29.4 parts) is added and the reaction is held at 150° C. for 3 hours. Add 24.7 parts of a 50% aqueous sodium hydroxide solution and allow the reaction to mix at 150° C. for 3 hours. The reaction is cooled to 135° C. Volatile materials are removed by distillation under vacuum at 2.7 kPa (20 mm Hg). The reaction is filtered through diatomaceous earth and a cloth pad.

Example 17

A reactor is charged with 7000 parts of a 18.92% solids in toluene slurry of a maleic anhydride/styrene (1:1 mole ratio) copolymer having RSV=0.70. Toluene is removed by distillation at 120° C. To the reaction is added 1643.3 parts of a 100N Group 1 base oil, 749.1 parts Alfol 810, and 227.6 parts 4-phenylazoanaline. The reaction is heated to 135° C., under nitrogen flow, and held for approximately 24 hours. To the reaction is added 1138.6 parts of Alfol 1218 and 92.0 parts of methanesulfonic acid (drop wise). The temperature is increased to 150° C. and water is removed via water/toluene azeotrope over 24 hours. Approximately 102.3 parts water is recovered. Butanol (29.4 parts) is added and the reaction is held at 150° C. for 3 hours. Add 24.7 parts of a 50% aqueous sodium hydroxide solution and allow the reaction to mix at 150° C. for 3 hours. The reaction is cooled to 135° C. Volatile materials are removed by distillation under vacuum at 2.7 kPa (20 mm Hg). The reaction is filtered through diatomaceous earth and a cloth pad.

Example 18

A reactor is charged with 500 parts of a 12.2% solids in toluene slurry of a maleic anhydride/styrene (1:1 mole ratio) copolymer having RSV=0.42. Toluene is removed by distillation at 120° C. To the reaction is added 160 parts of a 100N Group 1 base oil, 94.7 parts Alfol 1218, and 15.4 parts of aminodiphenylamine, which is added drop wise in the molten state over a period of about 2 hours. The reaction is heated to 135° C., under nitrogen flow, and held for approximately 24 hours. To the reaction is added 4.6 parts of aqueous methanesulfonic acid (drop-wise). The temperature is increased to 150° C. and water is removed via water/toluene azeotrope over 24 hours. Butanol (1.63 parts) is added and the reaction is held at 150° C. for 1 additional hour. To the reaction is added 1.9 parts of 50% aqueous sodium hydroxide solution drop wise and mixed for 1 additional hour. Volatile materials are removed by distillation under vacuum at 4.0 kPa (30 mm Hg). The reaction is filtered hot through diatomaceous earth and a cloth pad.

Example 19 and Reference Example 1

Two lubricant formulations are prepared and are subjected to the Short Mack™ T-11 test. In this test a sample of lubricant is run in a Mack™ T-11 engine for up to about 80 hours. Over time, as soot is accumulated in the oil, samples are withdrawn and their kinematic viscosity is measured at 100° C. Results are reported as viscosity increase in $mm^2/s$ (cSt).

Reference Example 1 is a baseline sample containing oil and a commercial composition including an olefin copolymer viscosity modifier, dispersant(s), overbased calcium detergent(s), antioxidant(s) including aromatic amine antioxidant, a corrosion inhibitor, and other conventional components. Example 19 is substantially the same formulation but containing 4% of a dispersant viscosity modifier of the present inventions (as from the above examples generally, providing about 2.7% active chemical to the lubricant). The amine antioxidant is been removed in lieu of the aromatic amine functionality contained on the polymer, and the amount of conventional viscosity modifier is reduced by a comparable amount. Test results are shown below:

| Example 19 | | Reference Example 1 | |
| --- | --- | --- | --- |
| % soot | viscosity increase | % soot | viscosity increase |
| 0.1 | 1.5 | 0.04 | 2.4 |
| 1.0 | 1.2 | 1.1 | 1.5 |
| 1.9 | 1.6 | 2.1 | 1.7 |
| 2.9 | 2.1 | 3.0 | 2.3 |
| 4.0 | 3.2 | 4.0 | 3.6 |
| 5.0 | 4.7 | 5.0 | 6.0 |
| 6.2 | 7.9 | 6.0 | 15.0 |
| 6.9 | 13.8 | 7.1 | 68.4 |

The lubricant containing the dispersant viscosity modifier of the present invention retains acceptable low viscosity increase (i.e., less than 12 cSt increase) up to higher soot concentration than does the lubricant of Reference Example 1.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What is claimed is:

1. An esterified, nitrogen-functionalized interpolymer composition derived from monomers comprising (i) at least one monomer selected from (a) vinyl aromatic monomers, and (ii) at least one α,β-unsaturated acylating agent;
    wherein a portion of said acylating agent-derived units is esterified and wherein a portion of said acylating agent-derived units is condensed with at least one aromatic amine containing at least one N—H group capable of condensing with said acylating agent monomer-derived unit, said amine being selected from the group consisting of 4-aminodiphenylamine, 4-phenylazoaniline, 2-aminobenzimidazole, and 3-nitroaniline.

2. The composition of claim 1 wherein the vinyl aromatic monomer is styrene.

3. The composition of claim 1 wherein the α,β-unsaturated acylating agent (ii) is a maleic anhydride monomer or a reactive equivalent thereof.

4. The composition of claim 1 where the esterified, nitrogen-functionalized interpolymer has a weight average molecular weight of about 5,000 to about 300,000.

5. The composition of claim 1 where the aromatic amine comprises about 3 to about 25 percent by weight of said composition.

6. The composition of claim 1 wherein a portion of said acylating agent-derived units is condensed with an amine having at least two N—H groups capable of condensing with said carboxylic acid functionality.

7. The composition of claim 1 wherein a portion of said acylating agent-derived units is condensed with an aliphatic amine of up to 10 carbon atoms.

8. The composition of claim 1 wherein the esterified portion of the acylating agent-derived unit comprises the ester of alcohols containing 1 to 30 carbon atoms.

9. A lubricant composition comprising a major amount of an oil of lubricating viscosity and a minor amount of the composition of claim 1.

10. The lubricant composition of claim 9 further comprising at least one additive selected from the group consisting of detergents, dispersants, viscosity modifiers, antioxidants, pour point depressants, friction modifiers, and anti-wear agents.

11. The lubricant composition prepared by admixing the components of claim 10.

12. A concentrate comprising the composition of claim 1 and a concentrate-forming amount of an oil of lubricating viscosity.

13. A process for lubricating an internal combustion diesel engine equipped with exhaust gas recirculation, comprising supplying thereto an esterified, nitrogen-functionalized interpolymer composition derived from monomers comprising (i) at least one monomer selected from (a) vinyl aromatic monomers, and (ii) at least one $\alpha,\beta$-unsaturated acylating agent;
    wherein a portion of said acylating agent-derived units is esterified and wherein a portion of said acylating agent-derived units is condensed with at least one aromatic amine containing at least one N—H group capable of condensing with said acylating agent monomer-derived unit, said amine being selected from the group consisting of 4-aminodiphenylamine, 4-phenylazoaniline, 2-aminobenzimidazole, and 3-nitroaniline.

14. A process for preparing a dispersant viscosity modifier, comprising reacting, in any order:
    (a) a carboxy-containing interpolymer comprising monomer-derived units of (i) at least one monomer selected from (a) vinyl aromatic monomers and (b) aliphatic olefins containing 2 to about 30 carbon atoms, and (ii) at least one $\alpha,\beta$-unsaturated acylating agent;
    (b) at least one alcohol having about 8 to about 30 carbon atoms; and
    (c) at least one aromatic amine containing at least one N—H group capable of condensing with said carboxylic acid acylating agent, said amine being selected from the group consisting of 4-aminodiphenylamine, 4-phenylazoaniline, 2-aminobenzimidazole, and 3-nitroaniline.

15. The process of claim 14 wherein the carboxy-containing interpolymer is further reacted with (d) at least one alcohol containing 1 to 6 carbon atoms, or a non-aromatic amine, or both; wherein at least a portion of the alcohol containing 1 to 6 carbon atoms or the non-aromatic amine is supplied after at least about 90 mole percent of the acylating agent component of (a) has reacted with components (b) and (c), whereby a major portion of any remaining unreacted acylating agent component reacts with component (d).

16. A process for preparing a dispersant viscosity modifier, comprising
    (a) copolymerizing:
        (i) at least one monomer selected from (a) vinyl aromatic monomers and (b) aliphatic olefins containing 2 to about 30 carbon atoms;
        (ii) at least one alpha, beta-unsaturated acylating agent; and
        (iii) the condensation product of an alpha, beta-unsaturated acylating agent with at least one aromatic amine selected from the group consisting of 4-aminodiphenylamine, 4-phenylazoaniline, 2-aminobenzimidazole, and 3-nitroaniline; and
    (b) reacting the product of (a) with at least one alcohol having about 8 to about 30 carbon atoms.

17. The process of claim 14 wherein the interpolymer is a polymer of styrene and maleic anhydride.

18. The process of claim 16 wherein the monomer of (i) comprises styrene and the monomer of (ii) comprises maleic anhydride.

19. A process for lubricating an internal combustion engine, comprising supplying thereto an esterified, nitrogen-functionalized interpolymer composition derived from monomers comprising (i) at least one monomer selected from (a) vinyl aromatic monomers and (b) aliphatic olefins containing 2 to about 30 carbon atoms, and (ii) at least one $\alpha,\beta$-unsaturated acylating agent;
    wherein a portion of said acylating agent-derived units is esterified and wherein a portion of said acylating agent-derived units is condensed with at least one aromatic amine containing at least one N—H group capable of condensing with said acylating agent monomer-derived unit, said amine being selected from the group consisting of 4-aminodiphenylamine, 4-phenylazoaniline, 2-aminobenzimidazole, and 3-nitroaniline.

* * * * *